No. 760,136. Patented May 17, 1904.

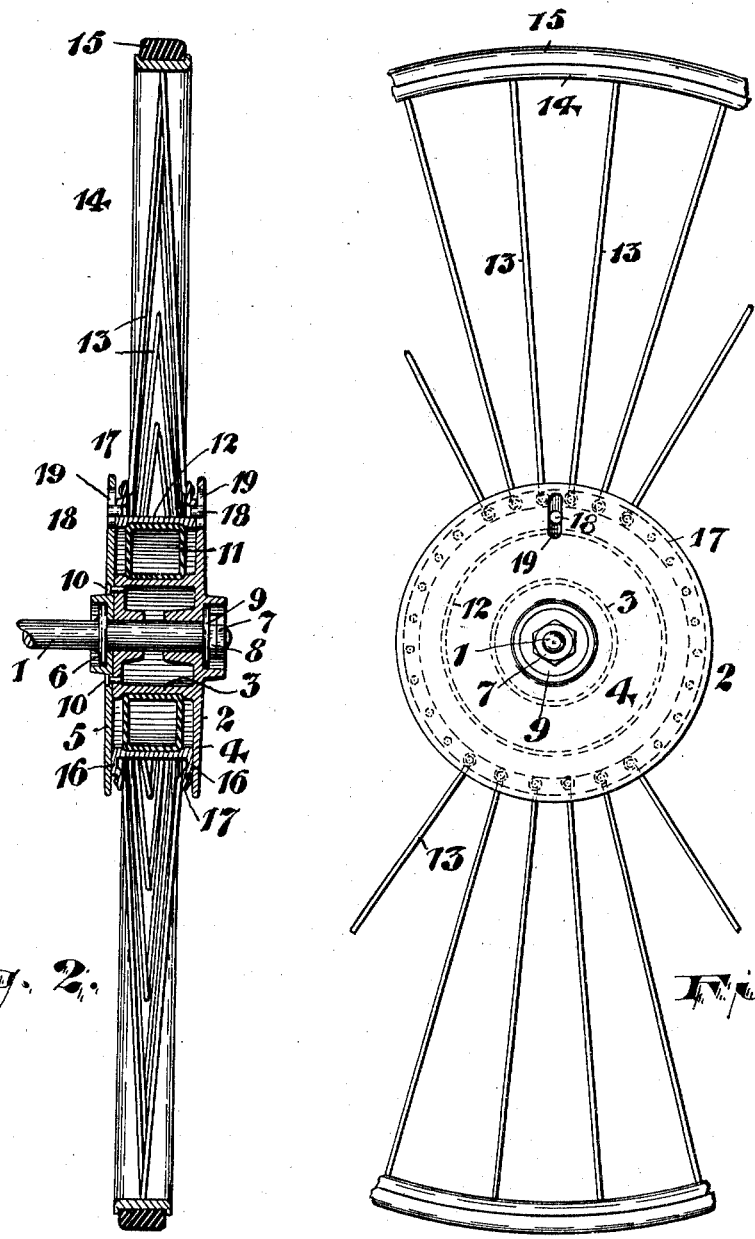

UNITED STATES PATENT OFFICE.

DANIEL F. MINAHAN, JR., OF ORANGE, NEW JERSEY.

PNEUMATIC-CUSHIONED VEHICLE-WHEEL.

SPECIFICATION forming part of Letters Patent No. 760,136, dated May 17, 1904.

Application filed April 29, 1903. Serial No. 154,744. (No model.)

*To all whom it may concern:*

Be it known that I, DANIEL F. MINAHAN, Jr., a citizen of the United States, residing at Orange, in the county of Essex and State of New Jersey, have invented and produced a new and useful Improvement in Pneumatic-Cushioned Vehicle-Wheels; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to secure in a wheel all the effects of a pneumatic cushion-tire without the liability to wear and puncture so common in such wheels, to this end to locate the cushion at the hub of the wheel and secure a construction which will permit the same cushioning action as when a pneumatic tire is on the rim, and to obtain other advantages and results, some of which may be referred to hereinafter in connection with the description of the working parts.

The invention consists in the improved pneumatically-cushioned vehicle-wheel and in the arrangements and combinations of parts of the same, all substantially as will be hereinafter set forth and finally embraced in the claim.

Referring to the accompanying drawings, in which like numerals of reference indicate corresponding parts in both of the figures, Figure 1 is a side elevation of a wheel of my improved construction, a portion of the rim and spokes being broken away; and Fig. 2 is a central cross-section of the same.

In said drawings, which illustrate a wheel fast on or driven by its axle, 1 indicates such an axle having mounted upon itself near the outer end a hub 2. Said hub is centrally bored to receive the axle and farther out from its center is provided with an annular cushion seat or drum 3, having at its opposite ends flanges 4 5, projecting peripherally a considerable distance beyond its surface. Said hub lies at its inner side against a shoulder 6 on the axle, and nuts 7 8 and a washer 9 on the outer end of the axle serve for clamping the hub against said shoulder. Preferably the drum portion of the hub and its outer flange 4 are cast in one integral piece, while the inner flange 5 is formed by a separate casting or plate bolted against the inner end of the first casting, as by bolts or screws 10. This construction permits the removal of one flange for the insertion upon the seat or drum 3 of the cushion 11, which is preferably a tubular pneumatic ring of any suitable and well-known construction. Although I have shown said annular cushion as substantially square or rectangular in cross-section, it may obviously be of any desired shape, and, furthermore, the said cushion may be other than a pneumatic tube, if desired, so long as it has the necessary cushioning qualities, and its ends, although brought together, need not be joined to form a complete ring. Outside the said cushion and likewise between the flanges 4 5 is an annular band 12, having at its outer surface means for the attaching of spokes 13, which extend outward to the rim 14 of the wheel, said spokes and rim being of any ordinary construction and the latter being provided with a tire 15 of a solid rubber or any other suitable kind. Preferably the means for attachment of the spokes 13 to the band 12 consist of outer peripheral flanges 16 at the opposite edges, which are bent or pressed inward, as at 17, and perforated to receive the headed ends of the spokes; but any other appropriate means may be employed. The band 12, it will be understood, is free to move or slide between the flanges 4 5 of the hub according as the annular cushion 11 is compressed by the weight or strain upon the wheel. To prevent rotation of said band 12 and outer portion of the wheel independent of the hub, however, and at the same time permit the radial sliding above referred to, pins or studs 18 project outwardly from the opposite flanges 16 16 of the band 12 and lie in closed radial slots 19 19 of the flanges 4 5.

When it is desired to have the wheel loose on its axle instead of fast, as shown, the nuts 7 8 and washer 9 are not screwed up to clamp the hub, but are set far enough away from the same to permit rotation on the axle, as will be understood. Under these conditions also the pins 18 may be either left in the slots 19 or removed entirely.

Obviously my invention may be adapted to various kinds of wheels by such slight modifications of construction as would suggest themselves to any skilled workman, and I therefore do not wish to limit myself by the positive descriptive terms therein employed, except as the state of the art may require.

Having thus described the invention, what I claim as new is—

The combination with an axle, of a hub providing an annular portion having an interior bearing for said axle and an interior flange at one end, an annular cushion upon said annular portion of the hub, a band outside said cushion, spokes radiating from said band, and an independent plate adapted to be removably secured to the hub opposite its flanged end, having a central bearing for the axle and forming at its peripheral portion a flange.

In testimony that I claim the foregoing I have hereunto set my hand this 14th day of April, 1903.

DANIEL F. MINAHAN, Jr.

Witnesses:
CHARLES H. PELL,
C. B. PITNEY.